United States Patent
D'Epiro

(10) Patent No.: US 11,815,040 B2
(45) Date of Patent: Nov. 14, 2023

(54) VEHICLE ENGINE SYSTEM PROVIDED WITH A TURBOCHARGER, AND CONTROL METHOD FOR CONTROLLING SUCH ENGINE SYSTEM

(71) Applicant: FPT INDUSTRIAL S.P.A., Turin (IT)

(72) Inventor: Clino D'Epiro, Alpignano (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 17/792,873

(22) PCT Filed: Jan. 20, 2021

(86) PCT No.: PCT/IB2021/050417
§ 371 (c)(1),
(2) Date: Jul. 14, 2022

(87) PCT Pub. No.: WO2021/148958
PCT Pub. Date: Jul. 29, 2021

(65) Prior Publication Data
US 2023/0050478 A1    Feb. 16, 2023

(30) Foreign Application Priority Data

Jan. 20, 2020  (IT) .................. 102020000000991

(51) Int. Cl.
*F02D 41/00* (2006.01)
*F02B 37/04* (2006.01)
(Continued)

(52) U.S. Cl.
CPC .......... *F02D 41/0007* (2013.01); *F02B 33/32* (2013.01); *F02B 37/04* (2013.01); *F02M 35/10118* (2013.01); *F02B 2037/122* (2013.01)

(58) Field of Classification Search
CPC .............. F02B 37/04; F02M 35/10157; F02M 35/10118; F02D 41/0007
See application file for complete search history.

(56) References Cited

U.S. PATENT DOCUMENTS 6,062,026 A * 5/2000 Woollenweber ....... F02M 26/08
60/605.2
6,141,965 A * 11/2000 Woollenweber ........ F02B 37/12
60/612
(Continued)

FOREIGN PATENT DOCUMENTS

DE  102014018578 B3 *  1/2016  .............. F02B 33/40
DE  102018208894 A1  12/2019
(Continued)

OTHER PUBLICATIONS

Translation of FR-3069023-A1 provided by Clarivate.*
International Search Report and Written Opinion in PCT Application No. PCT/IB2021/050417, dated May 6, 2021 (13 pages).

*Primary Examiner* — Ngoc T Nguyen
(74) *Attorney, Agent, or Firm* — Leason Ellis LLP

(57) ABSTRACT

An engine system has an internal combustion engine, a turbocharger provided with a compressor and with a turbine; and a supply line, which supplied air to the engine through said compressor; the supply line has a supplementary compression stage, which is distinct from the compressor and is controlled in combination with and adjustment of the turbine, in order to limit the back pressure of the exhaust gases flowing out of the engine; in particular, said compression stage is defined by an ejector.

8 Claims, 2 Drawing Sheets

(51) Int. Cl.
    *F02M 35/10*     (2006.01)
    *F02B 33/32*     (2006.01)
    *F02B 37/12*     (2006.01)

(56) References Cited

U.S. PATENT DOCUMENTS

2006/0144046 A1    7/2006    Vetrovec
2009/0071438 A1*    3/2009    Shiraishi ............... F02D 31/002
                                                                                           123/403

FOREIGN PATENT DOCUMENTS

FR             3069023 A1    1/2019
JP              S5756623 A    4/1982
KR        20160119700 A   10/2016

\* cited by examiner

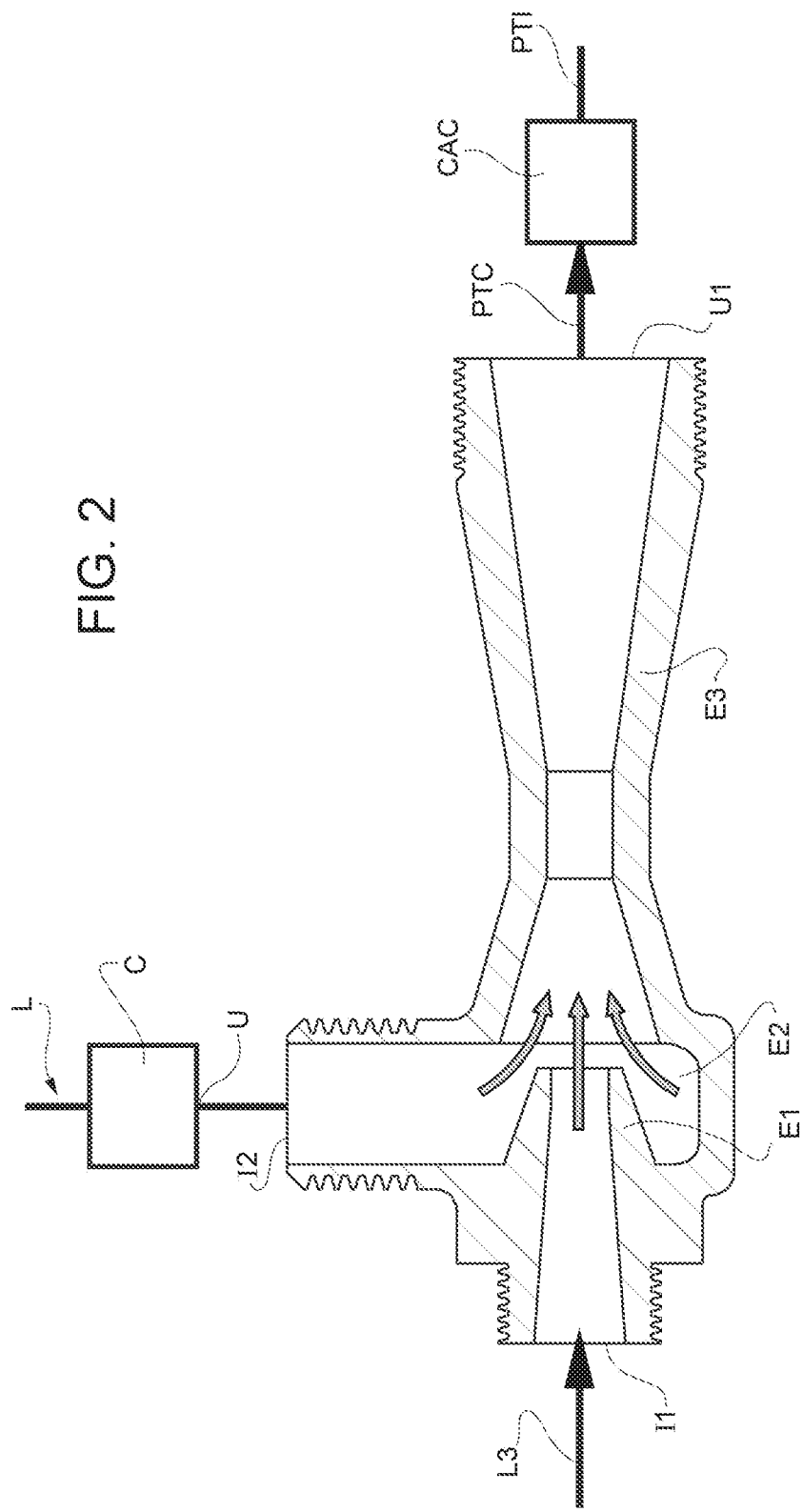

VEHICLE ENGINE SYSTEM PROVIDED WITH A TURBOCHARGER, AND CONTROL METHOD FOR CONTROLLING SUCH ENGINE SYSTEM

CROSS-REFERENCE TO RELATED APPLICATIONS

This patent application is a U.S. National Phase Application under 35 U.S.C. § 371 of International Patent Application No. PCT/IB2021/050417, filed on Jan. 20, 2021, which claims priority from Italian patent application no. 102020000000991 filed on Jan. 20, 2020, the entire disclosure of which is incorporated herein by reference.

TECHNICAL FIELD

The invention relates to a vehicle engine system provided with an internal combustion engine and with a turbocharger.

KNOWN STATE OF THE ART

As it is known, when dealing with internal combustion engines supercharged by means of a turbocharger, there is a strong need to reduce the so-called "turbolag", which basically is a delay in the response times of the supercharging compressor, in case of acceleration starting from a relatively low value of revolutions per minute and/or after a driving phase in which the engine brake function is active (which generally implies a chocking of an outlet letting exhaust gases out of the engine).

In order to fulfil this need, some known solutions are configured so as to generate an increase in the supercharging of the compressed air (usually called "boost") based on the acceleration commands set by the driver and, if necessary, also based on his/her driving style.

For example, document U.S. Pat. No. 7,665,302 discloses the use of a secondary supply line, for a further compressed air flow, and of a throttle valve arranged on the main supply line downstream of the supercharging compressor. The secondary supply line is joined to the main supply line downstream of the throttle valve. This device is controlled so as to close or reduce the air passage flowing through the supercharging compressor and, at the same time, supply compressed air to the engine from the secondary line, for example when the accelerator pedal of the vehicle is released (namely, in case of engine brake).

Known solutions involving a "boost" in the compressed air supply need to be improved in order to optimize the overall operation of the engine, increase the efficiency thereof and recover energy, in the best way, from other operating conditions of the engine. In particular, there is a need of reducing the specific consumption of the engine during the cruising phases of the vehicle, defined for examples by trip segments with a constant speed.

Secondly, the specific solution of document U.S. Pat. No. 7,665,302 needs to be improved, since, in this solution, the restriction or closure generated by the throttle valve in the main line can lead to instability phenomena for the operation of the supercharging compressor, when the compressor speed tends to increase thanks to the exhaust gases flow through the turbine during the acceleration phase, while the throttle valve is still closed. These phenomena are generally indicated as "surge" and, as time goes by, they can lead to degenerative or destructive events on the blades of the compressor.

Therefore, aim of the invention is to fulfil the needs discussed above in a simple and economic manner.

SUMMARY OF THE INVENTION

The aforesaid aim is achieved by a vehicle engine system as defined in claim 1, and by a control method for controlling such engine system as defined in claim 8.

In addition, the dependent claims define specific embodiments of the invention.

BRIEF DESCRIPTION OF THE DRAWINGS

Preferred embodiments of the invention will be described hereinafter by mere way of non-limiting example with reference to the accompanying drawings, wherein:

FIG. 2 shows, in a sectional view, a component of the diagram of FIG. 1.

DETAILED DESCRIPTION OF THE INVENTION

Figure 1:
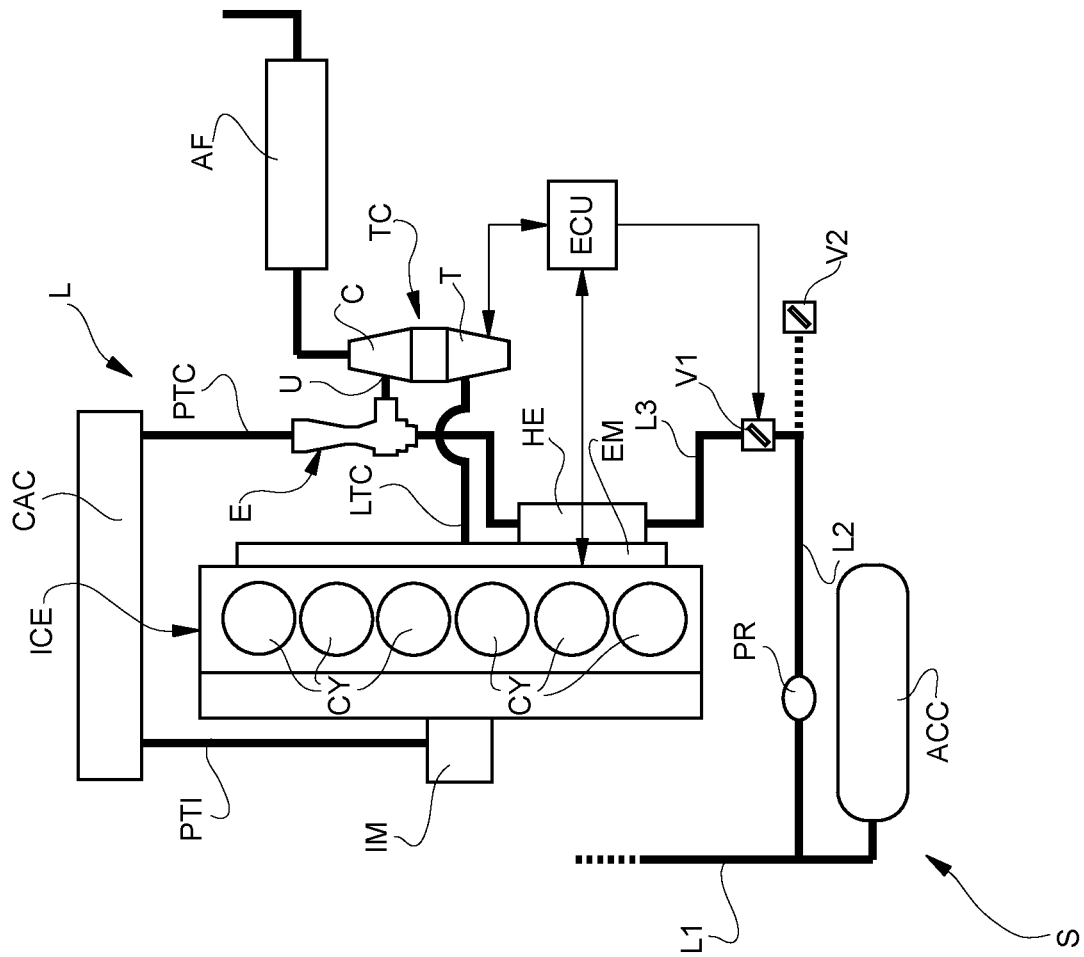
FIG. 1 shows a diagram of a preferred embodiment of the engine system provided with a turbocharger according to the invention.

With reference to FIG. 1, reference number 1 indicates, as a whole, an engine system (which is shown in a partial and schematic manner).

More in detail, the engine system 1 comprises:
- an internal combustion engine ICE comprising one or more cylinders CY;
- a turbocharger TC comprising a compressor C and a turbine T, which operates the compressor C;
- a supply line L, which supplies air to the cylinders CY of the engine ICE through the compressor C;
- an air filter AF, which is connected to an inlet of the compressor C, so that the latter sucks ambient air through the air filter AF.

Preferably, a heat exchanger CAC (defined, for example, by a so-called "intercooler") is arranged along the line L so as to cool the compressed air conveyed to the engine ICE. The line L further comprises an intake manifold IM of the engine, which receives compressed air cooled by the heat exchanger CAC and delivers said air to intake valves of the cylinders CY. Therefore, the line L comprises a branch PTC, which pneumatically connects an outlet U of the compressor C to an inlet of the heat exchanger CAC, and a branch PTI, which connects an outlet of the heat exchanger CAC to the intake manifold IM.

The engine ICE is supplied with fuel, which, in the cylinders, is mixed with the air coming from the line L. The engine ICE preferably is a compression ignition engine, so that the injected fuel can be Diesel fuel.

The engine ICE produces exhaust gases, which flow into an exhaust line LTC, where the turbine T is arranged, which, hence, is caused to rotate by the gas flow. The activation of the compressor C by the turbine T preferably is mechanical, for example by means of a direct activation defined by a transmission shaft, but, according to a variant which is not shown herein, it can be electric (namely, the compressor C is activated by an electric motor powered by an electric current, which is supplied by a battery pack and by at least one generator, which, in turn, is operated by the turbine T).

In conventional applications, the pressure of the air compressed by the compressor C basically depends on the work of the turbine T and, hence, on the enthalpy of the exhaust gases upstream of the turbine T, which, in turn, depends on the operating conditions of the engine ICE. In general, the compressor C can provide compressed air at pressures ranging from 1.1 bar to 3.5 bar, based on the rotation speed of the turbine T.

According to a preferred aspect of the invention, the engine system 1 further comprises an energy source, which, in the example shown herein, is defined by a source S of pressurised air. The source S comprises a tank ACC and a supply line L1 connected to the tank ACC, so that the latter can store/accumulate air under pressure. In particular, the line L1 can connect the tank ACC to a compressor by means of a valve (which are not shown). For example, said compressor can be operated by the engine ICE and can be defined by a compressor supplying a braking system of the vehicle (which is not shown). However, compressed air could be supplied to the tank ACC in different ways (for example, through compression of air in the cylinders CY during an engine brake operating phase).

In any case, the air reaching the tank ACC is already filtered in a known manner, which is not shown herein.

The source S comprises a joining line L2, which connects the tank ACC and/or the line L1 to an outlet valve V1. The valve V1, in turn, is connected to the line L by means of a connection line L3, so that the tank ACC can deliver air to the intake manifold IN, as described more in detail below. In other words, the valve V1 adjusts an air flow from the tank ACC to the line L3. Preferably, the valve V1 is an on-off valve, so that it is selectively controlled so as to allow air to flow through, or prevent it from doing so. If necessary, the valve V1 can be controlled not only so as to prevent air from flowing to the line L3, but also so as to restrict the outlet thereof and adjust the air flow rate reaching the line L3.

Conveniently, the line L2 comprises a pressure reducer PR having the function of adjusting or limiting the pressure value available downstream of the reducer PR. In particular, the reducer PR is calibrated or is controlled in an active manner so as to adapt the pressure level to design requirements or to requested values at the line L and/or at the line L3 (and to the needs of possible further compressed air users, which are connected to the source S by means of at least one further valve V2). According to a variant which is not shown herein, the functions carried out by the reducer PR and by the valve V1 can be integrated in one single valve.

According to a preferred aspect of the invention, the line L3 is connected to the line L by means of an ejector E, which is configured so that the air coming from the source S along the line L3 causes a compression of the flow downstream of the ejector E and a depression that sucks air from the outlet U of the compressor C, as schematically shown in FIG. 2.

Basically, the ejector E defines a supplementary compression stage, which is arranged in series with the compressor C along the line L and is controlled by operating the valve V1, so as generate a further pressure difference in the air supplied to the engine ICE, besides the pressure difference already provided by the compressor C.

The ejector E is arranged downstream of the compressor C and, in particular, along the branch PTC of the line L. However, according to a variant, the ejector E can be replaced by a different compression device (as described more in detail below), which is indifferently arranged upstream or downstream of the compressor C.

The configuration of the ejector E comprises: an inlet 11, which is connected to the source S through the line L3; and inlet 12, which is connected to the outlet U of the compressor C; an outlet U1, which is connected to the intake manifold IM, in particular through the heat exchanger CAC; a nozzle E1, which receives air from the inlet 11; a suction chamber E2, where the aforesaid depression is formed and where the air flowing out of the nozzle E1 is mixed with the air sucked in through the inlet 12; and a diffuser E3 having a diverging final segment, which ends at the outlet U1 and transforms part of the kinetic energy of the air flow into a pressure increase.

According to variants which are not shown herein, the ejector E is of the type having a variable geometry, for example of the type comprising a nozzle that receives air from the line L3 and is adjusted by a conical pin controlled by the control unit ECU so as to the change the flow cross section; and/or the ejector E integrates the function of the valve V1, by means of a suitable shutter controlled by the control unit ECU.

Thanks to the supplementary compression stage defined by the ejector E, the air flow at the outlet U1 has a higher pressure than the one that would be obtained with the operation of the sole compressor C, without air coming from the source S. In this way, the ejector E provides a so-called "boost", namely a supercharging increase. If no air is supplied by the source S, the pressure downstream of the ejector E is the same as the one available at the outlet U, except for normal load losses present in the ducts and in the ejector E.

The ejector E can advantageously be used under special operating conditions of the engine ICE in order to obtain a supercharging without "turbolag" phenomena for the turbocharger TC (or with a lower "turbolag" compared to solutions without "boost"). For example, the source S and the ejector E are used in the acceleration phase of the engine, in the presence of a relatively low value of revolutions per minute of the engine ICE and/or when the rotation speed of the compressor C is relatively low and/or immediately after an engine brake phase. Under these conditions, the work provided by the turbine T tends to increase thanks to the exhaust gas flow when the engine ICE is accelerated in response to the command of the driver acting upon the accelerator pedal and, at the same time, the suction caused by the ejector E affects the compressor C by reducing the resistance at the outlet U, so that the response times of the turbocharger TC are reduced.

This also leads to an advantage in terms of transitory acceleration conditions, with regard to a reduction in the smoke produced at the exhaust.

An electronic control unit (preferably defined by a control unit ECU controlling the engine ICE) is provided in order to control the valve V1 so as to open/close the supply of air from the source S and, if necessary, so as to adjust the flow rate and/or the pressure of the air flow depending on operating parameters of the engine ICE and/or of the turbocharger TC and/or of the line L and/or of the source S (the values of these parameters being determined by means of suitable sensors, which are nor shown herein). In particular, the valve V1 is opened and controlled so as to reach the supply pressure value requested by the control unit ECU based on the acceleration command given by the driver and based on the instantaneous operating conditions of the engine. For example, as already mentioned above, the control unit ECU is configured so as to open the valve V1 when the engine ICE is accelerated, in particular after an engine brake operating phase that slowed down the vehicle and/or when the compressor C has a rotation speed below a given threshold and/or when the torque requested by the driver would require (with the same air/fuel lambda ratio) a greater air quantity than the one than can be delivered by the sole compressor C.

The use of the ejector E not only is advantageous in acceleration transitions, but it also leads to an increase in the efficiency of the engine during constant speed trips, since it can exploit the use of air that was compressed and supplied to the tank ACC during the braking actions with the engine brake activated.

According to a preferred aspect of the invention, the line L3 goes through a heat exchanger HE to heat the air flowing from the source S to the ejector E, in order to reduce the quantity of air needed to allow the ejector E to operate according to the requests of the control unit ECU. Indeed, the heating tends to cause an increase in the volumetric flow rate, which decreases the air flow rate from the tank ACC to obtain the requested pressure downstream of the ejector E.

Preferably, the heat exchanger HE uses the heat of the exhaust gases produced by the engine ICE to heat the conveyed to the inlet 11. For example, the heat exchanger HE is coupled to an exhaust manifold EM connecting the engine ICE to the exhaust line LTC or is coupled to a known EGR line.

According to an aspect of the invention, the turbine T of the turbocharger TC can be adjusted so that it can change its rotation speed and the work produced.

In particular, it is of the type having a variable geometry, namely it has a stator or distributor with blades that can be adjusted by means of rotation or an axially movable wall, so as to change the flow section and the angle of incidence of the gases upon the blades. This adjustment, as mentioned above, changes the rotation speed of the turbine T. As it is known, a change in the geometry of the stator and, hence, in the flow section leads to a change in the back pressure of the exhaust gases present between the cylinders CY and the turbine T: given the same operating conditions of the engine ICE, when the openings between the blades are larger, the back pressure of the gases and, as a consequence, the rotation speed of the turbine are lower; on the contrary, when the openings between the blades are smaller, the back pressure and the speed of the turbine T are higher.

Therefore, the strategy to control the flow through the ejector E, namely the strategy to control the supplementary compression stage, is integrated and coordinated with the strategies to control the distributor of the turbine T. In particular, since the rotation speed of the turbine T corresponds to the one of the compressor C (if the latter is mechanically operated by the turbine T), the ejector E is used to decrease the supercharging pressure provided by the sole compressor C and, hence, reach the requested setpoint pressure value, as mentioned above; at the same time, since the work requested from the compressor C is reduced, the opening of the variable geometry of the turbine T can be increased. As a result, it is possible to obtain the same level of supercharging as the one that could be provided by the sole compressor C, without the use of the ejector E, but having the turbocharger TC work at lower rotation speeds and with lower back pressure to the engine.

In this way, in the presence of loads that are typical of cruising speeds, which are approximately one third of the maximum loads, the turbine T operates in a range of rotation speeds and flow sections of the distributor nozzles in which it has a higher efficiency. In particular, the boost provided by the ejector E allows the distributor to be closed to a smaller extent compared to the prior art where no ejector E is present, thus keeping the turbine in an area of higher efficiency. In general, indeed, the point of highest efficiency of a turbine with a variable geometry (for example, a turbine of the type known as "PIVOTING VANE") is reached when the distributor is approximately 60%-70% closed. In the presence of low loads, which are typical of cruising speeds, in order to maintain the necessary supercharging pressure in known solutions without additional compressor, the turbine, on the contrary, is closed by less than 40%.

Similar considerations also apply to the compressor C, where lower compression ratios with the same flow rate cause the compressor C to work in an area of its characteristic map featuring a higher efficiency.

These two effects interact with one another: since the overall efficiency of the turbocharger TC is the product of the efficiency of the turbine T by the one of the compressor C by the mechanical efficiency (which, though, always is very high and is not affected by the load), said overall efficiency significantly improves. This improvement affects the engine: in order to establish an empirical rule, we can say that approximately 5 percentage points of improvement of the turbocharger efficiency correspond to one percentage point of improvement of the entire engine.

Furthermore, this combination or integration between the two controls makes it easier for the engine to accelerate, since it allows the turbocharger to reach a steady state in a short time.

Furthermore, at the end of the transition due to accelerations and after having reached a steady state, namely a cruising condition of the vehicle, thanks to the contribution of the ejector E, the distributor of the turbine T can reach a closure degree that is smaller than the one of known solutions without ejector E.

This allows the vehicle to get as close as possible to the maximum efficiency opening of the turbine T and to reach the technical object of the minimizing the exhaust back pressure of the engine. Thanks to this result of minimizing the exhaust back pressure, as it is known, there always is a reduction in the specific consumption of the vehicle, even up to the possibility of generating a positive power in case the intake pressure is higher than the exhaust back pressure, namely when there is a positive difference between the supercharging pressure in the intake manifold IM and the back pressure or pressure in the exhaust manifold EM.

This is what, in the automotive industry, is defined as "positive pumping cycle", which can be reached, in known solutions, in very small areas of the engine map, under slow running and high load conditions (these terms are opposed to the so-called "negative pumping cycle", which absorbs useful power and is typical of combustion engines). In this way, the engine acts as if it were the expander of a virtual pneumatic system, generating a positive power during the so-called pumping cycle, namely during the passive phases of the four-stroke cycle.

This advantage, namely the mechanical energy increase at the drive shaft, is basically not affected by the energy spent to store compressed air in the tank ACC, because the compression energy needed to do so can advantageously be taken from the engine system 1 when the engine ICE operates under engine brake conditions, namely when the drive wheels do not need to be powered.

As explained above, the control carried out by the control unit ECU entails adding a further pressure difference to the one provided by the compressor C, so as to obtain a given setpoint value of the pressure (or of the flow rate) of the air supplied to the engine. For example, a closed loop control is provided, which is based on a first pressure sensor (not shown), which is designed to detect the pressure of the air supplied to the engine ICE (for example, in the intake manifold). Furthermore, a second pressure sensor (not shown) is arranged between the compression stage defined by the compressor C and the supplementary compression stage defined by the ejector E, so as to determine the contributions provided by the two stages in order to establish the overall pressure difference of the air flow supplied to the engine.

At the same time, the variable geometry of the turbine T is adjusted depending on a parameter indicative of the pressure at the intake of the engine ICE and on a parameter indicative of the work of the turbine T, so that the parameter kept under control remains within an established range, for example is kept at a setpoint value of its. To this regard, it should be pointed out that the back pressure of the exhaust gases when they flow out of the engine ICE determines the pressure difference astride the turbine T, which, in turn, determines the work produced by the turbine T itself, so that work and back pressure are correlated with one another.

The range or threshold establishing when to exert an action upon the turbine T can be represented by fixed values of by values that change in response to the operating conditions of the engine ICE and/or of the turbine T.

The rotation speed of the turbine T can advantageously be used as parameter indicative of the work of the turbine T (and, as a consequence, of the back pressure of the exhaust gases). Preferably, a closed loop control is provided in order to carry out the adjustment of the variable geometry and check whether the controlled parameter is below the established threshold. For example, in case the parameter is the rotation speed of the turbine T, this quantity can directly be detected by a speed sensor (not shown) or be estimated by the control unit ECU based on other data concerning the operation of the engine system.

Therefore, the control of the control unit ECU basically opens the distributor so as to limit the rotation speed of the turbine T (and, hence, reduce the back pressure), if said speed tends to exceed the aforesaid threshold or setpoint, while the supplementary compression stage (defined by the ejector E, in this specific case) is controlled so as to give its contribution to the pressure difference and obtain the setpoint defining the desired air pressure/flow rate.

In this way, not only does the supplementary compression stage make up for possible intrinsic faults of the turbocharger TC during acceleration transitions, but, under other operating conditions, it replaces part of the work that would be made by the compressor C if there were no limitations to the speed of the turbine T (and, hence, no reduction of the back pressure of the engine exhaust).

According to a variant, the limitation of the rotation speed can also be obtained by means of a turbine with a fixed geometry provided with a wastegate valve, which has an intervention threshold and/or an intervention instant controlled by the control unit ECU. In other words, according to the invention, the turbine could be adjusted by acting upon the wastegate valve so that part of the exhaust gases bypass the impeller of the turbine (instead of acting upon a distributor with a variable geometry) in order to limit the rotation speed of the turbine shaft and, as a consequence, the back pressure of the gases flowing out of the engine.

Furthermore, as mentioned above, the supplementary compression stage could be different from the ejector E. For example, according to variants which are not shown herein, it could be defined by a supplementary compressor device operated:

by an electric motor, which, in turn, is powered by an electrical energy source, preferably generated by recovering energy during the braking actions of the vehicle; in this case, the source S and the tank ACC are basically replaced by an energy source having a battery where electrical energy is stored; or by a further turbine, for example a steam turbine, which is part of a waste heat recovery system and absorbs waste heat from the exhaust gases and/or from the motor in order to transforms said heat into mechanical energy (and then, if necessary, into electrical energy), also during the normal running of the vehicle; this variant also allows for a reduction in the number of gears and/or joints, as the steam turbine can directly be coupled to the supplementary compressor device; said supplementary compressor device could be defined by a known rotary compressor, for example a centrifugal compressor like the compressor C, but provided with an aerodynamic map that is optimized based on a lower design compressor ratio.

These variants do not alter the possibility of recovering energy that would otherwise be lost (from the braking actions, from the waste heat, etc.) and of making said energy available on the line L in the supplementary compression stage, while the latter is controlled in combination with the adjustment of the turbine T in order to limit the back pressure of the gases flowing out of the engine ICE.

Owing to the above, the advantages of the engine system 1 according to the invention are evident. Indeed, the combined control of the supplementary compression stage and of the geometry of the turbine allows the engine ICE to be supplied with energy that was previously stored during the braking actions and/or exploiting waste heat. Furthermore, a reduction in the exhaust back pressure, even to a relatively small extent, can generate relatively big energy differences for the drive shaft, since the work made or saved can be expressed as $\Delta P \times \Delta V$: even in the presence of low $\Delta P$, the work can be big, if the displacement of the engine (which defines the volume variations $\Delta V$) is big, which is the case with industrial engines.

Indeed, the control of the turbine T allows the exhaust back pressure to be reduced up to reaching a positive pressure difference astride the cylinders CY (between the pressure of the intake manifold IM and the back pressure of the exhaust manifold EM), in order to increase the mechanical energy produced at the drive shaft. Furthermore, as explained above, the turbocharger TC operates in an operating field in which it is more efficient.

Moreover, when the ejector E is supplied by the source S, the engine is more efficient, since it can exploit air that was compressed during an engine brake phase, and/or the turbocharger TC has shorter response times compared to known solutions, where the supercharging is given by the sole compressor C.

In particular, a charging "boost" can be provided during the acceleration phase, without jeopardizing the operating stability of the compressor C and, more in general, without compromising the operating and structural conditions of the turbocharger TC.

Furthermore, it is also possible to only provide a boost under cruising conditions in order to reduce the power absorbed by the compressor C and optimize the efficiency of the engine ICE.

In addition, the specific solution suggested herein with the ejector E is extremely simple to be designed, manufactured and installed, since it has an extremely low number of components, is extremely compact and also entails a limited number of valves or movable elements to be controlled.

As mentioned above, the heat exchanger HE allows the quantity of air needed by the ejector E to be reduced in an extremely simple and compact manner, especially if the exhaust gases of the exhaust manifold EM are used as heat source.

Finally, the engine system 1 can clearly be subjected to changes and variants compared to what described above and shown herein by mere way of example, without because of this going beyond the scope of protection set forth in the appended claims.

In particular, as mentioned above, the source S or the way in which the tank ACC is pressurised could be different from the ones indicated above by way of example, taking anyway into account that the supplementary compression stage is preferably supplied with energy recovered during an engine brake operating phase and/or from waste heat.

Furthermore, the heat used to the heat the air of the line L3 could be provided by an electrically powered heater, instead of being provided by the heat exchanger HE.

The invention claimed is:

1. An engine system (1) comprising:
   an internal combustion engine (ICE);
   a turbocharger (TC) comprising a compressor (C) and a turbine (T);
   a supply line (L) that provides air to the engine (ICE) through said compressor (C);
   said supply line (L) comprising a supplementary compression stage distinct from said compressor (C); control means being provided for controlling said supplementary compression stage and for adjusting said turbine (T), in order to limit the back pressure of the exhaust gases exiting said engine, in a combined manner with the control of said supplementary compression stage;
   wherein said supplementary compression stage comprises an ejector (E) connected to a pressurized air source (S) and arranged downstream of said compressor (C) so as to receive air from said source (S) and cause, in use, a depression that sucks air out of said compressor (C).

2. The engine system according to claim 1, further comprising a heater for heating air that flows, in use, from said source (S) to said ejector (E).

3. The engine system according to claim 2, wherein said heater is defined by a heat exchanger (HE) arranged so as to exploit the heat of exhaust gases produced, in use, by said engine (ICE).

4. The engine system according to claim 1, wherein said ejector (E) has a variable geometry.

5. The engine system according to claim 1, wherein said control means are configured so as to supply air into said ejector (E) from said source (S) when said engine is accelerated and at least one of the following conditions occurs:
   the acceleration is controlled immediately after an engine brake phase;
   said compressor (C) has a rotational speed below a given threshold;
   the torque required for the acceleration needs a supply air amount and/or a supply air pressure higher than the one that would be deliverable by the compressor (C) alone.

6. A control method for controlling an engine system according to claim 1, the method comprising the steps of:
   providing a pressure difference in said line by means of said compressor (C);
   controlling said supplementary compression stage so as to provide a further pressure difference for achieving a given setpoint of air pressure/air flow rate to be supplied to said engine (ICE);
   adjusting said turbine (T) in order to limit the back pressure of the exhaust gases exiting said engine;
   wherein said further pressure difference is provided by supplying air from a pressurized air source (S) to an ejector (E), which is arranged downstream of said compressor (C).

7. The method according to claim 6, wherein said turbine is adjusted as a function of a parameter indicative of the work produced by said turbine.

8. The method according to claim 7, wherein said turbine is adjusted so as to keep said parameter below a given threshold and/or at a given setpoint.

* * * * *